(12) United States Patent
Taghezout

(10) Patent No.: US 7,385,362 B2
(45) Date of Patent: Jun. 10, 2008

(54) METHOD FOR DRIVING A VIBRATING DEVICE FOR A PORTABLE OBJECT THAT COMPRISES A COIL AND A MOVING MASS

(75) Inventor: Daho Taghezout, Morges (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 159 days.

(21) Appl. No.: 11/289,561

(22) Filed: Nov. 30, 2005

(65) Prior Publication Data
US 2006/0144173 A1 Jul. 6, 2006

(30) Foreign Application Priority Data
Dec. 9, 2004 (EP) ................................. 04106436

(51) Int. Cl.
*H02K 33/00* (2006.01)
(52) U.S. Cl. ...................... 318/114; 318/119; 318/126; 318/129; 318/135
(58) Field of Classification Search ................. 318/114
See application file for complete search history.

(56) References Cited
U.S. PATENT DOCUMENTS
5,436,622 A * 7/1995 Gutman et al. .............. 340/7.6

2004/0008105 A1 * 1/2004 Rota et al. ................ 340/407.1

FOREIGN PATENT DOCUMENTS

| EP | 938 034 | 8/1999 |
| EP | 952 663 | 10/1999 |
| WO | WO 00/38891 | 7/2000 |
| WO | WO 02/46847 | 6/2002 |

* cited by examiner

*Primary Examiner*—Lincoln Donovan
*Assistant Examiner*—Michael Brandt
(74) *Attorney, Agent, or Firm*—Sughrue Mion, PLLC

(57) ABSTRACT

The drive method consists in setting in vibration a moving mass of a vibrating device for a portable object using a series of voltage pulses provided to the coil of the vibrating device, which is electro-magnetically coupled to the moving mass. In a phase of driving the oscillations of the moving mass after a start phase of the vibrating device, followed by a resonant frequency measurement phase, successive rectangular voltage pulses of alternating polarity are provided to the coil by a drive circuit. The width of the successive pulses is modulated in a substantially similar manner during each successive oscillation period which allows a substantially sinusoidal voltage wave ($S_F$) of determined amplitude to be defined whose fundamental frequency is adapted to the resonant frequency of the moving mass. By modifying the oscillation period, it is thus possible to act on the amplitude of the moving mass oscillations which depends on the sinusoidal wave amplitude defined by the rectangular pulse width modulation.

6 Claims, 5 Drawing Sheets

US 7,385,362 B2

METHOD FOR DRIVING A VIBRATING DEVICE FOR A PORTABLE OBJECT THAT COMPRISES A COIL AND A MOVING MASS

BACKGROUND OF THE INVENTION

This application claims priority from European Patent Application No. 04106436.1 filed Dec. 9, 2004, the entire disclosure of which is incorporated herein by reference The present invention concerns a method for driving a vibrating device for a portable object. The vibrating device comprises a moving mass and a coil of annular shape electro-magnetically coupled to the moving mass, in order to make it oscillate. The vibrating device can be used in particular as a silent alarm or to indicate a telephone call.

There exist several embodiments of vibrating devices capable of fulfilling the function in particular of a silent alarm in order to be fitted to small sized portable objects, such as portable telephones, traditional organizers, pagers or wristwatches. At least one coil of these vibrating devices can be electrically actuated to activate a mass in order to create a low frequency vibration which can be felt by the person wearing such an object.

Generally, the frequency of the electrical signals applied to the coil is adjusted to correspond to the natural mechanical oscillation frequency of the moving mass of the vibrating device. In this way, maximal vibration amplitude can be obtained for a minimum of supplied electrical energy. The vibration of the device can be controlled by specific programming of the portable object so as to warn its user of a specific event, for example an alarm time, a telephone call or suchlike.

Patent document WO 02/46847, which discloses a method for driving such a vibrating device, can be cited in this regard. The vibrating device comprises a moving mass having a permanent magnet and a coil electro-magnetically coupled to the moving mass to make it oscillate. In order to make the mass oscillate, a drive circuit has to supply the vibrating device coil with rectangular drive voltage pulses of alternating polarity and determined length after the vibrating device start phase. The amplitude of the drive pulses approximately corresponds to the battery voltage electrically powering the drive circuit.

Between each drive voltage pulse, the coil is disconnected, i.e. it is placed in a high impedance state. In this state, the coil supplies an induced voltage due to the movement of the permanent magnet of the oscillating mass. A resonant frequency measurement is carried out at each zero crossing of the induced voltage in the drive circuit in order to adjust the period of the rectangular drive pulses supplied to the coil.

One drawback of such a drive method is that at each disconnection of the coil placed in the high impedance state, overvoltages, whose time constant is dependent upon the features of the coil, can be observed. These overvoltages can damage the electronic drive or supply circuit. Moreover, with these overvoltages, before the frequency measurement, a significant idle period has to be observed, which can be of the order of several hundreds of microseconds so as not to detect inadvertent zero crossings. This idle period, which has to be observed, limits the oscillation frequency to a low value. It is therefore necessary to filter the overvoltages by suitable means, either at the input of an amplifier comparator of the circuit, or at the output of the comparator. This involves providing the drive circuit with additional electronic components with the function of driving the oscillations of the moving mass, which complicates the manufacture of said circuit.

Another drawback of the drive method of WO 02/46847 is that the drive voltage pulses are made up of a fundamental frequency $f_0$ and harmonic frequencies $f_1$, $f_2$, which create power losses and stray forces, which oppose the active driving force of the oscillating mass. Consequently, higher electric consumption is observed. In the case of a determined battery voltage, the amplitude of the fundamental frequency signal relative to the rectangular drive pulses is at a voltage level that can be a third less than the battery voltage, and cannot thus be adapted to a higher value.

SUMMARY OF THE INVENTION

It is thus a main object of the invention to overcome the aforecited drawbacks by providing a method for driving a vibrating device using electrical signals supplied to the coil of the device, which are adapted to prevent overvoltages in a phase for driving the oscillations of the moving mass of the device. Moreover, the harmonics of the fundamental frequency, particularly low order harmonics, are removed via the electrical signals, since only the fundamental component of the electrical signals supplied to the coil supplies a useful force.

The invention thus concerns a method for driving an aforecited vibrating device which is characterized in that in a periodic moving mass oscillation drive phase, the method consists in providing successive rectangular voltage pulses of alternating polarity to the coil without interruption between each pulse using a drive circuit connected to the terminals of the coil of the vibrating device, the width of the successive pulses being modulated in a substantially similar manner during each successive oscillation period in order to define a substantially sinusoidal voltage wave of determined amplitude whose fundamental frequency is adapted to the resonant frequency of the moving mass.

One advantage of the method according to the invention lies in the fact that the width modulation of the voltage pulses of alternating polarity in each oscillation period comes close to a pseudo-sinusoidal fundamental frequency signal. Consequently, it is thus possible to remove the fundamental frequency harmonics by defining a substantially sinusoidal wave using the arrangement of said voltage pulses in each oscillation period. Mainly, the low order harmonics (3, 5, 7, 9) are removed, since they result in undesirable forces being generated.

As the moving mass describes a sinusoidal movement in relation to the fixed coil of the vibrating device, it is thus advantageous to power said coil by a substantially sinusoidal wave defined by the arrangement of the rectangular modulated width voltage pulses. The fundamental frequency of this sinusoidal wave is adapted to the resonant frequency of the moving mass. This thus also allows the undesirable force harmonics and losses of power to be eliminated.

It should be noted that as it is difficult to make a drive circuit capable of directly powering the coil of the vibrating device with a sinusoidal voltage wave, it is much easier to define it via the arrangement of the successive rectangular voltage pulses.

By powering the coil with rectangular voltage pulses without any interruption between each pulse, no overvoltages appear during the periodic moving mass oscillation drive phase, which is another advantage. The defined sinusoidal wave amplitude can be adjusted as a function of pulse width modulation in each oscillation period between a value close to the supply voltage of the drive circuit and the mass. In this way, the oscillation amplitude of the moving mass can be adjusted by the successive voltage pulses of alternating polarity. A gain can thus be obtained in electrical power consumption with such electric coil supply signals in relation to the drive method disclosed with reference to WO 02/46847.

Preferably, in order to remove harmonics, the successive rectangular voltage pulses of alternating polarity are arranged to have even symmetry in each oscillation half period in relation to a middle point of the half-period, and uneven symmetry in relation to a middle point of the oscillation period. 14 voltage pulses per oscillation period can advantageously be supplied to the vibrating device coil to remove at least the harmonics of order 3 and 5.

BRIEF DESCRIPTION OF THE DRAWINGS

The objects, advantages and features of the method for driving the portable object vibrating device will appear more clearly in the following description of at least one embodiment of the invention in conjunction with the drawings, in which.

DETAILED DESCRIPTION OF THE INVENTION

In the following description, all of the elements that make up the drive circuit and the vibrating device that are well known to those skilled in this technical field, will be explained in a simplified manner. Preferably, the vibrating device and the drive circuit are to be fitted to a portable object of small size, such as a wristwatch so as to provide a silent alarm by the vibration of a moving mass of the vibrating device.

Figure 1:
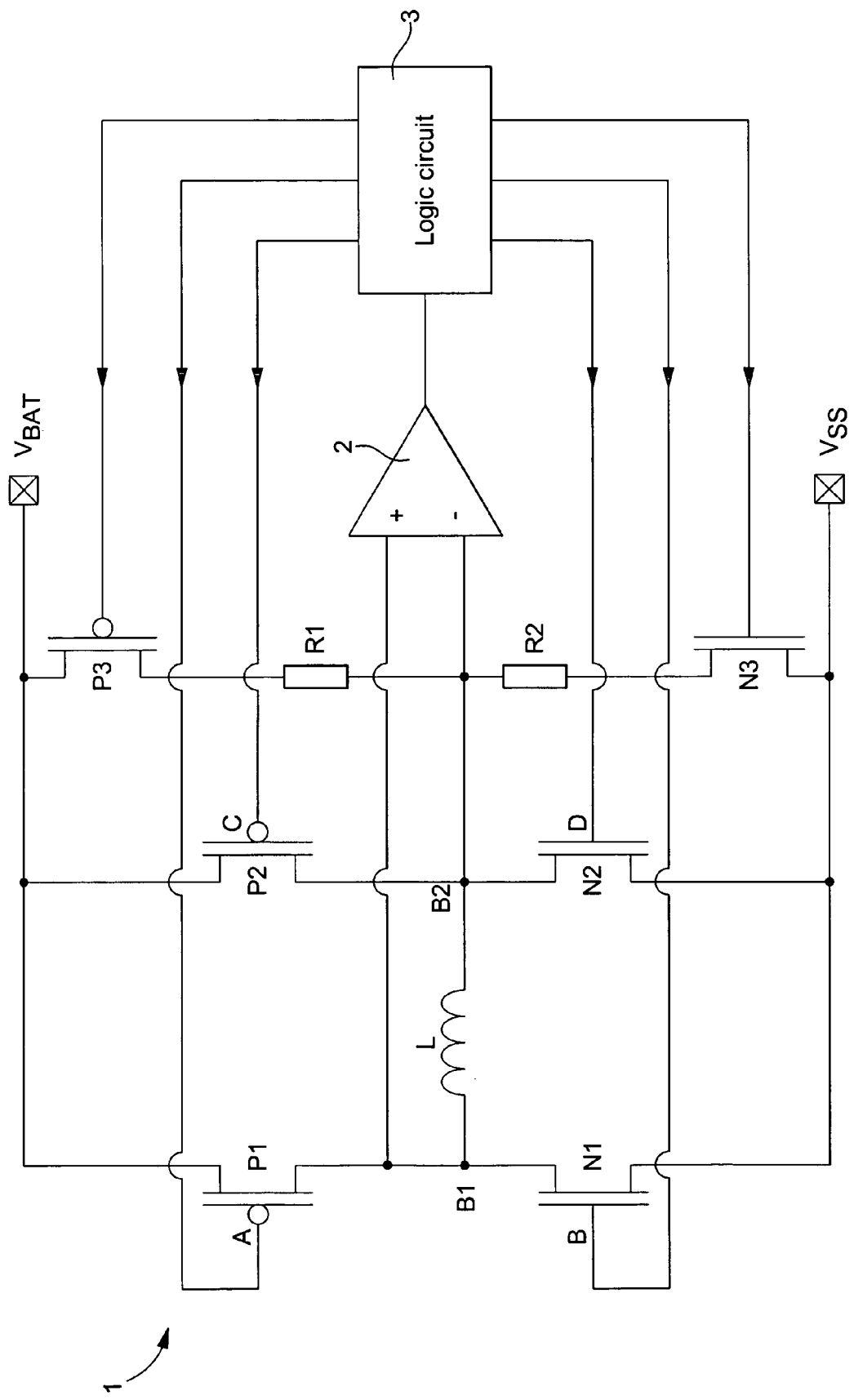
FIG. 1 shows a drive circuit of the vibrating device for implementing the drive method according to the invention.

In FIG. 1, a drive circuit 1 is shown for implementing the method for driving the vibrating device, which includes a moving mass provided with at least one permanent magnet and a coil of annular shape. This coil, which is indicated by the reference L, is shown schematically in FIG. 1. In drive circuit 1, the coil is connected via its two terminals B1 and B2 to switching elements N1, N2, P1, P2 which form an H-shaped bridge explained hereinafter.

For its electrical power supply, drive circuit 1 is connected via its two terminals $V_{BAT}$ and $V_{SS}$ to a voltage source that is not shown and which is preferably a battery able to deliver a continuous voltage of 3 V for example. When the vibrating device is made to vibrate, the first B1 and second B2 terminals of coil L are capable of being brought to a zero voltage (earth $V_{SS}$) or to a voltage $V_{BAT}$ depending upon the states of the switching elements N1, N2, P1, P2.

The switching elements are preferably formed by four MOS type transistors N1, N2, P1, P2 which form an H bridge in order to enable the vibrating device to be controlled in a bipolar mode. The H bridge thus comprises a first branch and a second branch comprising transistors N1 and P1, respectively transistors N2 and P2, which are series mounted between voltages $V_{BAT}$ and $V_{SS}$. More specifically, transistors P1 and P2 are P type MOS transistors and transistors N1 and N2 are N type MOS transistors. As can be seen in FIG. 1, the first terminal B1 of coil L is connected to the connection node of transistors N1 and P1 and the second terminal B2 is connected to the connection node of transistors N2 and P2.

The gates of transistors P1, N1, P2, N2 are respectively controlled by signals A, B, C and D produced by a logic circuit 3 and explained hereinafter.

In order to make a measurement of the oscillation or resonant frequency of the moving mass as it moves, the drive circuit comprises a comparator 2 formed of a differential amplifier. This frequency can be between 132 and 138 Hz. In order to do this, the first and second terminals B1, B2 of coil L are respectively connected to the non inverting (positive terminal) and inverting (negative terminal) terminals of comparator 2. This comparator 2 is responsible for amplifying and returning at output the movement induced voltage from the moving mass measured between terminals B1, B2 of coil L, when it is set in a high impedance state.

This movement induced voltage is applied to the input of logic circuit 3 responsible, on the one hand, for generating control signals A, B, C, D necessary for transistors N, N2, P1, P2 of the H bridge. These control signals have to generate at least one rectangular start voltage pulse at coil L, as well as successive rectangular voltage pulses of alternating polarity and modulated width in a moving mass periodic oscillation drive phase. On the other hand, logic circuit 3 is responsible for measuring the induced voltage frequency derived from comparator 2.

We will not dwell any longer on the making of logic circuit 3. Those skilled in the art can refer to European Patent Application no. EP 0 938 034, which is incorporated herein by reference, to obtain the information necessary to allow them concretely to make drive circuit 1 with logic circuit 3 on the basis of the indications which are provided hereinafter.

As illustrated in FIG. 1, drive circuit 1 further advantageously comprises a switchable voltage divider, which is responsible for imposing the determined voltage across the inverting input (negative input) of comparator 2. This voltage divider, in the form here of a resistive divider, forms a means for fixing the negative input of comparator 2 at a determined potential, when the movement induced voltage of the moving mass has to be observed solely in a resonant frequency measuring phase. This measurement frequency has to be achieved when coil L is placed in a high impedance state, i.e. when transistors N1, N2, P1 and P2 are in a non conductive state. This resistive divider is keyed on in the other phases.

More specifically, the resistive divider comprises a series arrangement between voltages $V_{BAT}$ and $V_{SS}$, of a first P-MOS transistor P3, of first and second resistors $R_1$, and $R_2$, and a second N-MOS transistor N3. The connection node between resistors $R_1$ and $R_2$ is connected to the inverting input of comparator 2 and the gates of transistors P3 and N3 are connected to logic circuit 3.

In this embodiment example, one may choose for example to fix the potential of the inverting terminal of comparator 2 at a voltage equal to $V_{BAT}/2$ using, for this purpose, resistors R1 and R2 of substantially equal values. When coil L is at the high impedance state, i.e. when transistors N1, N2, P1 and P2 of the H bridge are all in the non conductive state, the resistive divider is thus switch on by activating transistors P3 and N3 and a voltage substantially equal to $V_{BAT}/2$ is applied to the inverting input of comparator 2. Consequently, the mean value of the induced voltage is fixed at this level $V_{BAT}/2$.

By referencing the movement induced voltage of the moving mass with respect to the level $V_{BAT}/2$, one assures that the movement induced voltage is always positive, its peak to peak amplitude being less than voltage $V_{BAT}$. In the example embodiment described in this Application, it will be understood that the movement induced voltage is sampled at a determined frequency. By fixing the mean value of the movement induced voltage at this level $V_{BAT}/2$, all the signal samples are therefore positive.

It will easily be understood that the use of the resistive divider is not strictly necessary. It will also be understood that a different mean value from $V_{BAT}/2$ could be fixed by the resistive divider. The example which is shown here is particularly advantageous when it is desirable to carry out a digital processing of the signal produced at the output of comparator 2.

In the oscillation frequency measuring phase, a different measuring technique from that explained hereinbefore can be used. A current measurement operation can be carried out by scanning to obtain a minimum current value.

Figure 2:
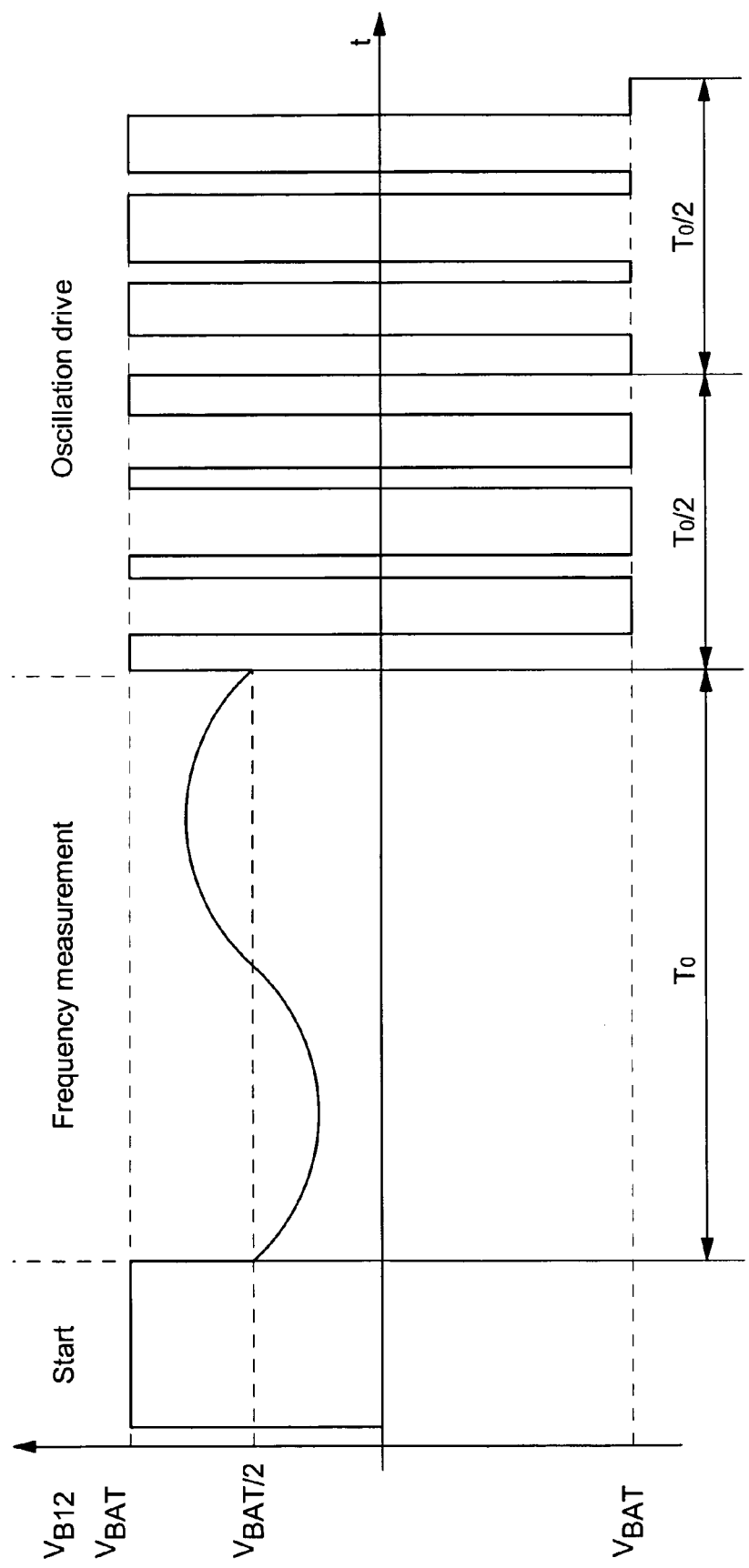
FIG. 2 shows a graph of the voltage at the terminals of the coil over time of different phases of setting in vibration the moving mass of the vibrating device for implementing the drive method according to the invention.

FIG. 2 shows schematically various phases for starting the vibrating device for implementing the drive method according to the invention. More specifically, the evolution of voltage $V_{B12}$ at the terminals of the vibrating device coil is shown over time. In a first phase, called the start phase, a rectangular start voltage pulse is supplied to the coil.

This first start phase, for setting in movement the moving mass, is followed by a second phase, called the frequency measurement phase, during which the moving mass of the device is left in free oscillation. During this second phase, the device will tend to oscillate in accordance with its natural oscillation frequency, hereinafter called the oscillation or resonant frequency $f_0$. This resonant frequency $f_0$ is for example measured by determining the oscillation period $T_0$ of the induced voltage generated by the movement of the mass during this second phase on the basis of crossings through the mean movement induced voltage level. Alternatively, one could simply measure the oscillation half-period of the signal.

This second measurement phase is not strictly necessary since the nominal period $T_0$ can be fixed beforehand if necessary. However, since the resonant frequency value is also dependent upon the conditions of wear of the portable object, such as a wristwatch, and a viscous friction coefficient, it is preferable to measure it using the drive circuit. This measurement enables the oscillation period of a set of rectangular voltage pulses supplied to the coil to be adjusted.

Once oscillation period $T_0$ has been determined or fixed, the vibrating device enters a third phase, called the moving mass periodic oscillation drive phase, which extends until the device is no longer made to vibrate. During this third phase, successive rectangular voltage pulses of alternating polarity are supplied to the coil. The width of the pulses varies or is modulated by oscillation period so as to define a pseudo-sinusoidal fundamental frequency voltage wave. This fundamental frequency is supposed to correspond to the resonant frequency of the moving mass of the vibrating device.

Figure 3:
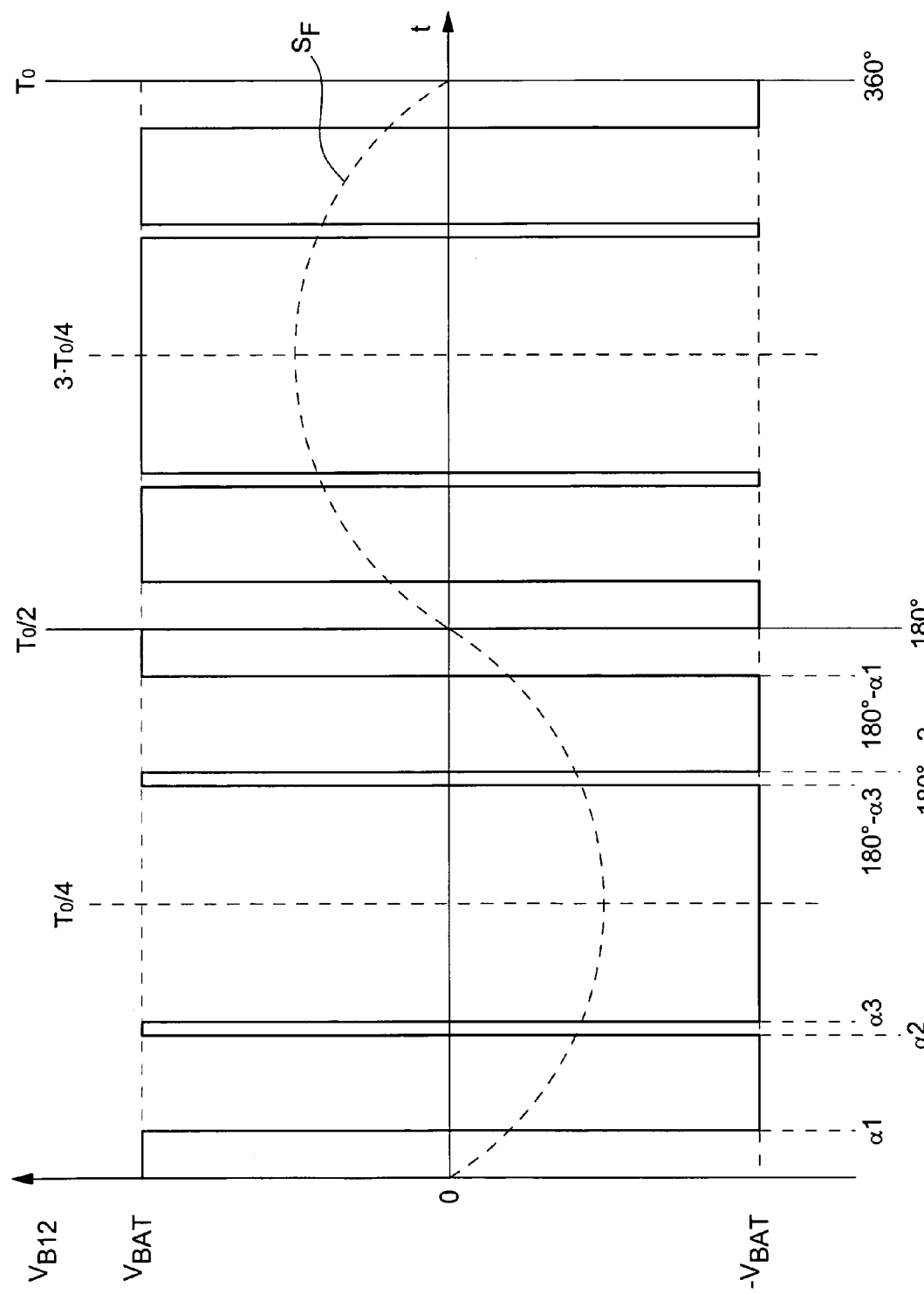
FIG. 3 shows a graph of the width modulation of the voltage pulses supplied to the coil in one moving mass oscillation period for implementing the drive method according to the invention.

FIG. 3 shows a graph of the width modulation of the voltage pulses of alternating polarity, which are supplied to the coil in each oscillation period of the moving mass to implement the drive method according to the invention. This pulse width modulation is preferably identical in all of the oscillation periods until the vibrating device is no longer made to vibrate. This graph thus shows an oscillation period $T_0$ defined in angular form from 0 to 360°. The sign inversion of each pulse is preferably determined by a specific angle comprised between 0 and 360° given that the measured resonant frequency may vary as a function of the conditions of wear of the portable object. However, after the second phase frequency measurement, the resonant frequency is determined in theory for the entire length of vibration of the vibrating device.

In order to drive the vibrating device according to the invention, a method is used for removing the harmonics of an order higher than 1 and for monitoring the fundamental amplitude. Indeed, as mentioned previously, harmonics of the order 3, 5, 7 and higher are the cause of losses in the coil and in iron parts of the vibrating device. By removing these harmonics and monitoring the fundamental frequency voltage wave thereby defined, one tends to come close to a sinusoidal voltage with the desired amplitude.

In a simple manner, it is possible to remove in particular harmonics 3 and 5 by pulse width modulation or pseudo-modulation as shown in FIG. 2 over a defined oscillation time period defined in angular form from 0 to 360°. The oscillation period has even symmetry in each oscillation half period $T_0/2$ or 180° in relation to a middle point of the half period $T_0/4$ or 90°. This oscillation period has uneven pulse symmetry in relation to a middle point of the oscillation period, i.e. in relation to $T_0/2$ or 180°. Over the first half period, sign inversions occur for the successive rectangular pulses for the angles values α1, α2 and α3, and (180°−α3), (180°−α2) and (180°−α1). The second half period is defined on the basis of angles of the first half period but with pulses of reverse polarity. This wave shape enables a discrete number of harmonics to be removed while imposing a determined fundamental frequency wave amplitude.

In the tables hereinbelow, various angle values are shown as a function of the desired amplitude of the fundamental frequency sinusoidal wave defined represented by the curve $S_F$. The fundamental amplitude can vary between 1.06 and 0.5 times the battery voltage depending upon the angle values chosen:

| Angle [°] | Fundamental Amplitude | | | | | |
|---|---|---|---|---|---|---|
| | 1.06 | 1.00 | 0.95 | 0.9 | 0.85 | 0.80 |
| α1 | 7.887051 | 16.81522 | 18.00331 | 18.75188 | 19.35348 | 19.8853 |
| α2 | 26.97772 | 45.83502 | 50.54754 | 52.92703 | 54.26793 | 55.04801 |
| α2 | 26.97772 | 45.83502 | 50.54754 | 52.92703 | 54.26793 | 55.04801 |

-continued

| Angle [°] | Fundamental Amplitude | | | | | |
|---|---|---|---|---|---|---|
| | 0.75 | 0.70 | 0.65 | 0.60 | 0.55 | 0.50 |
| α1 | 20.37667 | 20.841 | 21.28521 | 21.71332 | 22.12769 | 22.52973 |
| α2 | 55.4881 | 55.70542 | 55.7681 | 55.71848 | 55.5843 | 55.38451 |
| α3 | 64.93273 | 66.18637 | 67.29332 | 68.29485 | 69.21674 | 70.07847 |

By the selection of the fundamental amplitude, i.e. the amplitude of the sinusoidal wave defined by width modulation of rectangular voltage pulses of alternating polarity, it is possible also to adjust the oscillation amplitude of the moving mass of the vibrating device. This may be desirable in certain configurations of the portable object, such as in a wristwatch of small volume. With the tables of the angles determined as a function of the desired fundamental amplitude, it is easy to calculate width time values for each pulse using a rule of three as a function of the oscillation frequency value. This oscillation frequency can be situated in a range of 125 to 140 Hz, preferably of the order of 135 Hz for example.

Figure 4A:
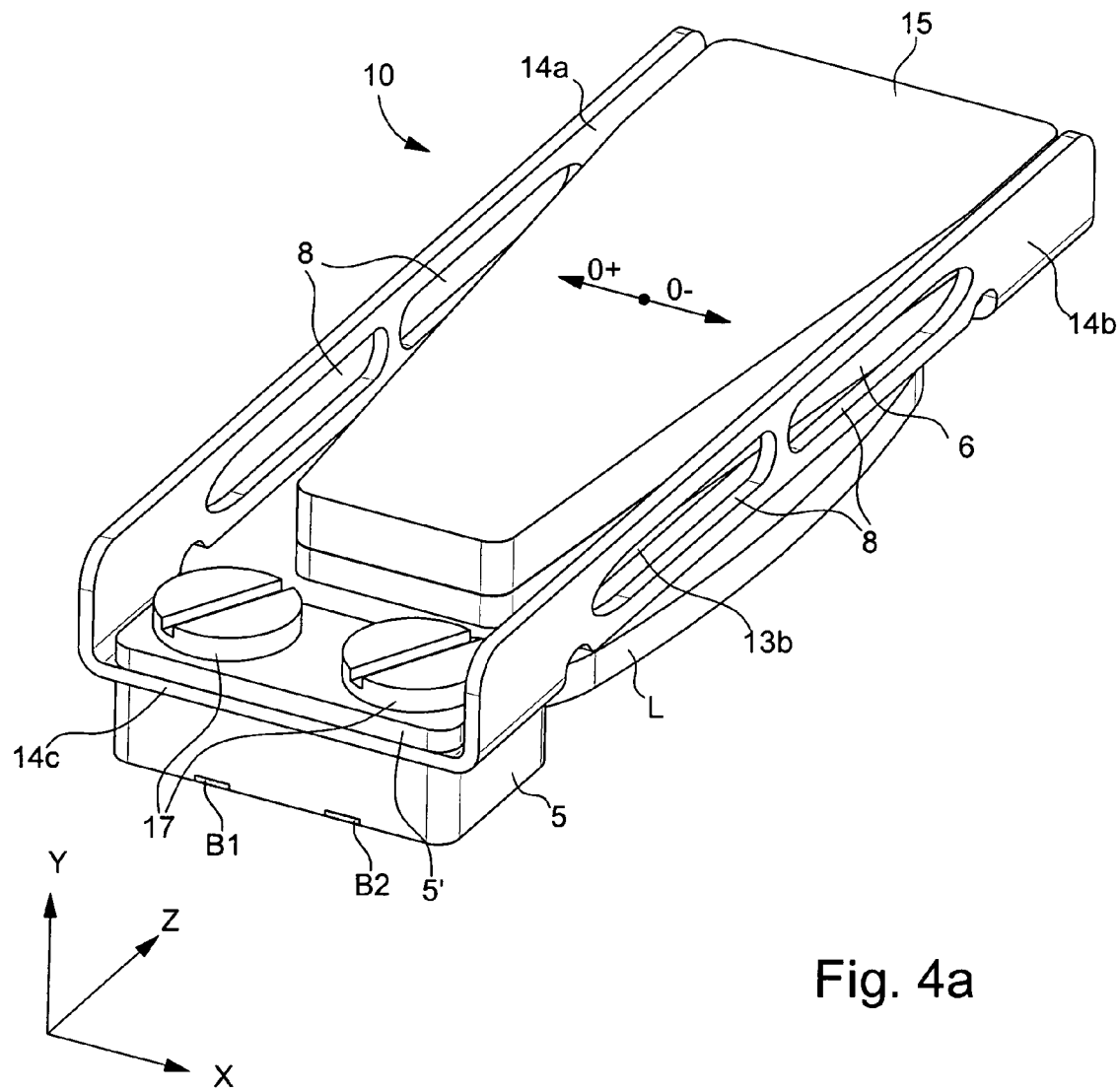
FIGS. 4a and 4b show a three-dimensional view and a side view of an embodiment of the vibrating device for implementing the drive method according to the invention.
Figure 4B:
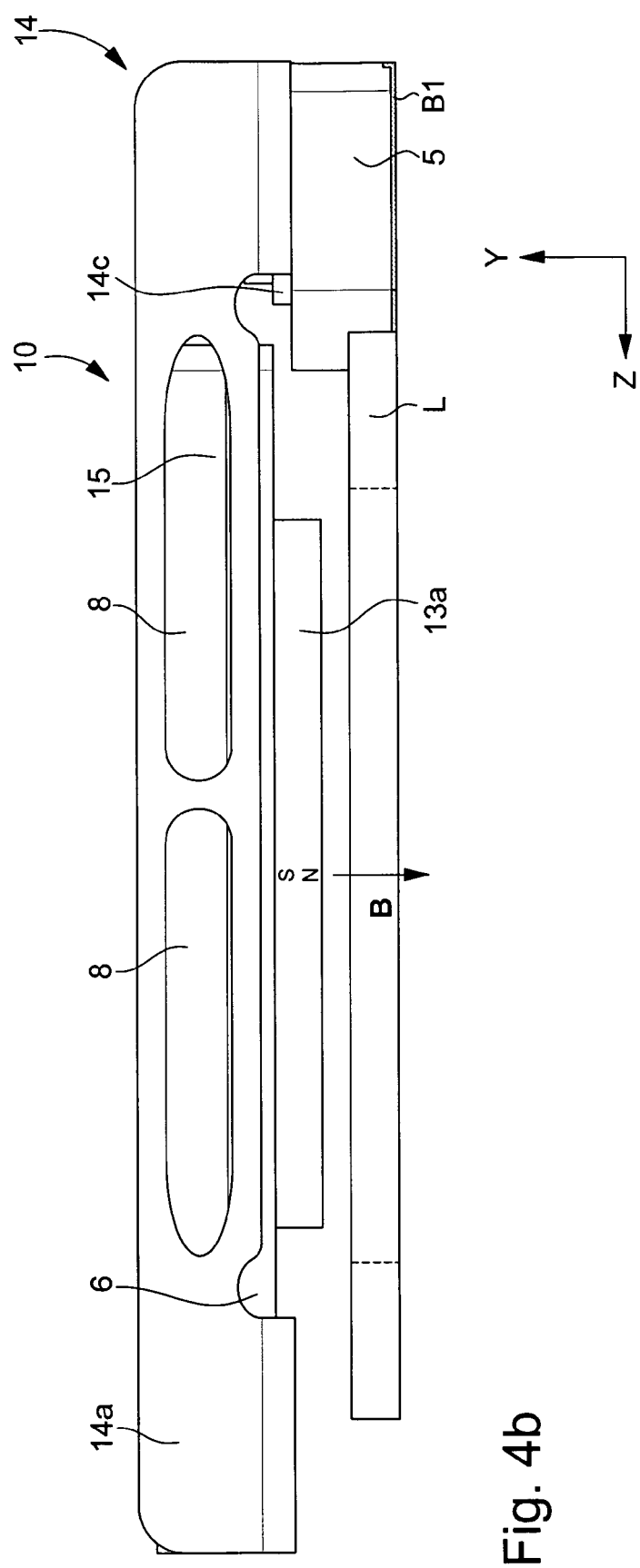

FIGS. 4a and 4b show an embodiment of the vibrating device 10 for implementing the drive method according to the invention. The vibrating device shown is of the half Voice Coil type. Vibrating device 10 comprises first of all an annular flat coil L, which is fixed at the edge to a non-magnetic structure 5 underneath which two coil connecting terminals B1 and B2 appear. The device also comprises moving mass 13a, 13b, 6 and 15 made of a magnetic structure which is connected to the non-magnetic structure without any mechanical contact with the coil using a spring element 14.

The magnetic structure of the moving mass comprises a ferromagnetic plate 6 on which there are fixed two adjacent permanent magnets 13a and 13b with opposite directions of magnetisation respectively facing two diametrically opposite portions of the coil. The magnets generate a magnetic field B, which is led into ferromagnetic plate 6, in a direction along axis Y. When the coil is powered by the successive rectangular voltage pulses, the current passing in the coil portions is substantially perpendicular to the magnetic field B in the direction of axis Z. Consequently a Laplace force in a direction along axis X is generated in order to cause the moving mass to oscillate in a substantially perpendicular plane to the axis of coil L in the directions shown O+ and O−.

In order to obtain a larger mass, a plate of complementary mass 15 can be placed on ferromagnetic plate 6. This complementary plate 15 can be made of a material such as brass or tungsten.

Spring element 14, which holds the moving mass, comprises a base strip 14c fixed by two screws 17 via a non-magnetic plate 5' on non-magnetic structure 5, and two strip springs 14a and 14b integral to the base strip and arranged on two opposite sides of the base strip. Strip springs 14a and 14b are arranged perpendicularly in relation to the base strip 14c, such that the transverse section forms a U. An end strip, not shown, connects the ends of strip springs 14a and 14b opposite the base strip. This end strip, on which a portion of ferromagnetic strip 6 is fixed, is in a substantially parallel plane to the base strip.

Ferromagnetic plate 6 and complementary plate 15 are placed between strip springs 14a and 14b with or without any direct contact with each strip spring. Preferably, the height of ferromagnetic plate 6 and complementary plate 15 is less than the height of each strip spring 14a and 14b. Strip springs 14a and 14b can each comprise two longitudinal transverse slots 8, which are sized to adjust a theoretic resonant frequency of the vibrating device. Because of this frequency adjustment, the vibrating device drive circuit can be of relatively simple design.

With the vibrating device presented in FIGS. 4a and 4b, the coil inductance is much lower than in the case of a coil mounted on a ferromagnetic support assembly as explained in document EP 0 625 738. The inductance value can be of the order of 1 to 1.5 mH, whereas in the case of a coil mounted on a ferromagnetic support assembly, this inductance value can be of the order of 50 mH. The induced voltage mainly linked to the mutual magnet-coil flux is also lower with this low inductance, and any overvoltage of the coil in the oscillation frequency measurement phase can be much lower without damaging the drive circuit. The dimensions of this vibrating device particularly for fitting to a wristwatch can be 10 mm long, 4 mm wide and 2 mm high.

Of course, the drive method can also be applied to a vibrating device such as that presented in EP 0 625 738. With such a vibrating device drive method, it is thus not necessary to fit the drive circuit with any filtering element, which simplifies the manufacture of said circuit and allows electric power consumption to be reduced.

From the description that has just been given, those skilled in the art can conceive multiple variants of the vibrating device drive method without departing from the scope of the invention defined by the claims. The coil could be placed in a high impedance state during the oscillation drive phase in order to readjust the oscillation frequency. In each period of the fundamental sinusoidal wave, a higher number of modulated pulses could be provided in order to remove higher order harmonics. Two or several successive rectangular pulses of different polarity could be provided in the start phase before placing the coil in the high impedance state.

What is claimed is:

1. A method for driving a vibrating device for a portable object, the device comprising a moving mass and a coil electromagnetically coupled to the moving mass in order to make said mass oscillate, wherein, in a phase of driving the periodic oscillations of the moving mass, the method comprises providing successive rectangular voltage pulses of alternating polarity to the coil without interruption between pulses using a drive circuit connected to terminals of the vibrating device coil, the width of the successive pulses being modulated in a substantially similar manner during each successive oscillation period in order to define a substantially sinusoidal or pseudo-sinusoidal voltage wave of determined amplitude whose fundamental frequency is adapted to the resonant frequency of the moving mass in order to remove the fundamental frequency harmonics, and wherein the successive rectangular voltage pulses of alternating polarity are arranged to have even symmetry in each oscillation half period in relation to a middle point of the half period, and uneven symmetry in each oscillation period in relation to a middle point of the oscillation period.

2. The driving method according to claim 1, wherein the drive circuit includes in a first branch first and second switching elements series mounted between a first and second supply terminals of a voltage source, and in a second branch third and fourth switching elements series mounted between the two electrical power supply terminals, in order to form an H bridge with the coil, whose first terminal is connected to the connection node of the first and second switching elements and the second terminal is connected to the connection node of the third and fourth switching elements, and a logic circuit supplying control signals to the switching elements in order to open alternately the first and fourth switching elements respectively the second and third switching elements to provide successive rectangular voltage pulses of alternating polarity to the coil, wherein the amplitude of the successive voltage pulses of alternating polarity is substantially equal to the continuous voltage value provided by the voltage source, and wherein the width of the successive voltage pulses of alternating polarity is modulated in a similar manner during each oscillation period to adjust the oscillation amplitude of the moving mass as a function of the amplitude of the sinusoidal voltage wave of fundamental frequency defined so as to adapt said amplitude to the conditions of wear of the portable object to increase or decrease the fundamental frequency wave amplitude when there is an increase or decrease in the viscous friction coefficient.

3. The driving method according to claim 1, further comprising providing a rectangular voltage pulse in a start phase of the moving mass that is initially at rest, and wherein at the end of the rectangular start pulse, the coil is placed in a high impedance state by the drive circuit in order to measure the oscillation frequency of the moving mass, which includes at least one permanent magnet, via the induced voltage in the coil generated by the movement of the moving mass in relation to the coil.

4. The driving method according to claim 1, wherein, in the phase of driving the periodic oscillations of the moving mass, the method further comprises providing the coil of the vibrating device with a number N of successive pulses of alternating polarity for each oscillation period, N being an even number higher than 6.

5. The driving method according to claim 4, wherein 14 successive rectangular voltage pulses of alternating polarity are provided to the coil over a defined oscillation period from 0 to 360°, the first sign inversion between the first and second pulses occurring from the start of the period at a time or an angle $\alpha 1$, the second sign inversion between the second and third pulses occurring at a time or angle $\alpha 2$ greater than $\alpha 1$, the third sign inversion between the third and fourth pulses occurring at a time or angle $\alpha 3$ greater than $\alpha 2$ and less than 90°, the fourth sign inversion between the fourth and fifth pulses occurring at a time or angle equal to $180°-\alpha 3$, the fifth sign inversion between the fifth and sixth pulses occurring at a time or angle equal to $180°-\alpha 2$, the sixth sign inversion between the sixth and seventh pulses occurring at a time or angle equal to $180°-\alpha 1$, the eighth to fourteenth pulses in the second half period defined from 180° to 360° being obtained by uneven symmetry of the first half period pulses in relation to 180°.

6. A method for driving a vibrating device for a portable object, the device comprising a moving mass and a coil electromagnetically coupled to the moving mass in order to make said mass oscillate, wherein, in a phase of driving the periodic oscillations of the moving mass, the method comprises providing successive rectangular voltage pulses of alternating polarity to the coil, without interruption between pulses using a drive circuit connected to terminals of the vibrating device coil, the width of the successive pulses being modulated in a substantially similar manner during each successive oscillation period in order to define a substantially sinusoidal or pseudo-sinusoidal voltage wave of determined amplitude whose fundamental frequency is adapted to the resonant frequency of the moving mass in order to remove the fundamental frequency harmonics.

* * * * *